(12) United States Patent
Hand

(10) Patent No.: US 6,812,406 B2
(45) Date of Patent: Nov. 2, 2004

(54) CABLE GLAND ASSEMBLY

(75) Inventor: Edward Hand, Cheshire (GB)

(73) Assignee: Hawke Cable Glands Limited, Lancashire (GB)

( * ) Notice: Subject to any disclaimer, the term of this patent is extended or adjusted under 35 U.S.C. 154(b) by 0 days.

(21) Appl. No.: 10/468,386

(22) PCT Filed: Jan. 21, 2002

(86) PCT No.: PCT/GB02/00239
§ 371 (c)(1),
(2), (4) Date: Aug. 19, 2003

(87) PCT Pub. No.: WO02/067400
PCT Pub. Date: Aug. 29, 2002

(65) Prior Publication Data
US 2004/0074662 A1 Apr. 22, 2004

(30) Foreign Application Priority Data
Feb. 20, 2001 (GB) .............................................. 0104083

(51) Int. Cl.⁷ ................................................. H02G 3/18
(52) U.S. Cl. ................................. 174/65 SS; 174/65 R; 174/135; 16/2.1
(58) Field of Search ................................. 174/59, 65 R, 174/65 SS, 65 G, 151, 135, 152 G; 439/583, 584, 462, 581; 16/2.1, 2.2; 248/56

(56) References Cited

U.S. PATENT DOCUMENTS

| | | | | |
|---|---|---|---|---|
| 3,492,410 A | * | 1/1970 | Kelly | 174/78 |
| 5,310,359 A | * | 5/1994 | Chadbourne et al. | 439/462 |
| 5,866,853 A | * | 2/1999 | Sheehan | 174/65 SS |
| 6,268,565 B1 | * | 7/2001 | Daoud | 174/65 SS |
| RE38,294 E | * | 11/2003 | Nattel et al. | 174/59 |

FOREIGN PATENT DOCUMENTS

| | | |
|---|---|---|
| FR | 2794909 | 6/1999 |
| GB | 1243572 | 3/1970 |
| GB | 1524684 | 12/1975 |
| GB | 2060281 A | 9/1980 |
| GB | 2104306 | 7/1981 |
| GB | 2224894 A | 9/1989 |
| GB | 2258567 | * 10/1993 |

* cited by examiner

Primary Examiner—Dhiru R Patel
(74) Attorney, Agent, or Firm—Rader, Fishman & Grauer PLLC

(57) ABSTRACT

A cable gland assembly for an electric cable having a sheath enclosing at least one conductor core is described, the assembly comprising a body and a barrier sleeve (4) locatable in the body wherein, in use, the at least one core extends through the body and the sleeve (4) and a hardenable compound is disposed in the sleeve (4) filling the sleeve and surrounding the at least one core, wherein the sleeve (4) comprises a resilient or elastic material.

17 Claims, 5 Drawing Sheets

Section A-A

CABLE GLAND ASSEMBLY

BACKGROUND OF THE INVENTION

1. Field of the Invention

The invention relates to electric cable gland assemblies.

2. Description of Related Art

A known type of cable gland assembly provides a barrier against leakage of liquid, gas or solid into the interstices of unfilled cables (i.e. cables which have voids or interstices within the cable between the cable cores and extending along its length) where the cable has had its outer sheath removed to enable the conductive elements of the cable cores to be connected to an item of electric equipment. The object of such cable glands is to avoid a flame path along the cable. Such cable gland assemblies are used in hazardous fire or explosion risk areas as are found on oil rigs for example. The invention relates particularly to cable gland assemblies of this type, wherein a hardenable compound is used to fill the space between and around the cable cores to prevent ingress of the liquid, gas or solid, the compound being contained within a sleeve or pot through which liquid, gas or solid, the compound being contained within a sleeve or pot through which the cores extend. Cable gland assemblies of this general type are known for example from GB 2 060 281A and GB 2 258 567 A.

Known compound sleeves or pots are made from metal, e.g. brass, or from rigid plastics material. Sleeves made of metal must be manufactured with precise tolerances. It is a burden to manufacture and check such high tolerances. Sleeves are also known which are provided with a separate seal, e.g. in annular form around the sleeve, to seal between the outer of the sleeve and the main body of the assembly.

An aim of the present invention is to provide at low cost a sleeve of simpler manufacture, construction and use.

It is also an aim of the present invention to improve the sealing of a sleeve.

SUMMARY OF THE INVENTION

According to the invention there is provided a cable gland assembly for an electric cable having a sheath enclosing at least one conductor core, the assembly comprising a body and a barrier sleeve locatable in the body wherein, in use, the at least one core extends through the body and the sleeve and a hardenable compound is disposed in the sleeve filling the sleeve and surrounding the at least one core, wherein the sleeve comprises a resilient or elastic material.

The resilient or elastic material preferably comprises a rubber or elastomer material. Further preferably, the sleeve substantially comprises a resilient or elastic material. More preferably, the sleeve completely comprises a resilient or elastic material.

The sleeve may be located with a compressed fit in the body i.e. with the resilient or elastic material, in use, located in the body under a degree of radial and/or axial deformation. An improved seal is thereby provided both between sleeve and body and sleeve and compound.

Advantageously, the sleeve in the invention is not required to be manufactured to the high tolerances of known sleeves. A suitable fit is easily achieved by the resilience or elasticity of the material.

The sleeve in the invention provides an improved seal between the outer of the sleeve and the inner of the assembly body. Since the sleeve comprises a resilient material, a seal between the outer of the sleeve and the inner of the assembly body is provided at least between a portion of the sleeve and the body, preferably between substantially the whole length of the sleeve and the body. In contrast, in the prior art, a separate annular seal is typically provided around the sleeve. Thus, the invention not only increases the degree of sealing, but it also replaces the separate two part construction of sleeve and seal with a single component.

The invention has also been found to be particularly advantageous in situations where the assembly may be subjected to considerable climate change, e.g. changes from high to low temperature and/or vice versa. With prior art sleeves there is always the possibility that the adhesion between the compound and sleeve may become reduced due to differing thermal expansion/contraction with potential compromise of the seal. However, in the invention, the sleeve comprising resilient or elastic material is able to deformably compensate for any loss of adhesion to provide a more consistent seal.

A yet further advantage is that if it is desired for any reason to remove the sleeve from the connector body, e.g. for inspection purposes, then the resilient material will allow a refitting of the sleeve in the connector body with little or no compromise in the quality of the seal either between sleeve and body or between sleeve and compound.

The sleeve of the invention is able to withstand cracking or melting over a wide range of temperatures. Preferably the sleeve of the invention is able to withstand temperatures from −60° C. to +100° C.

Preferably the sleeve material is not readily combustible.

The bore of the sleeve preferably has a frusto-conical shaped entry portion.

In many other respects the cable gland assembly of the invention may be constructed using known design features of cable glands.

Typically, the part of the assembly body in which the sleeve is located in use is an entry adapter, i.e. that part which connects to the equipment.

Preferably, the assembly comprises a camping spigot which, in use, is disposed at the frusto-conical end of the sleeve. Also, preferably, in use the spigot is urged against the sleeve by the engagement of a compression sleeve with the adaptor.

Further preferably the assembly comprises a clamping ring in use located annularly around a, typically complimentary shaped, surface of the spigot thereby to clamp an armour or earth element of the cable between the clamping ring and spigot.

The assembly also preferably further comprises a cap nut and outer cable seal to engage the exterior of the outer cable sheath by engagement of the cap nut with the compression sleeve.

The invention will now be described by way of the following examples and the accompanying drawings in which:

DETAILED DESCRIPTION OF THE PREFERRED EMBODIMENT

Figure 1A:
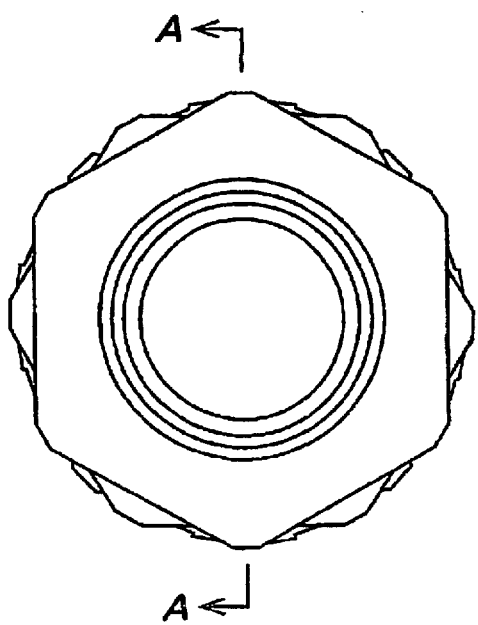
FIG. 1A is an end view of an embodiment of a cable gland assembly according to the invention.
Figure 1B:
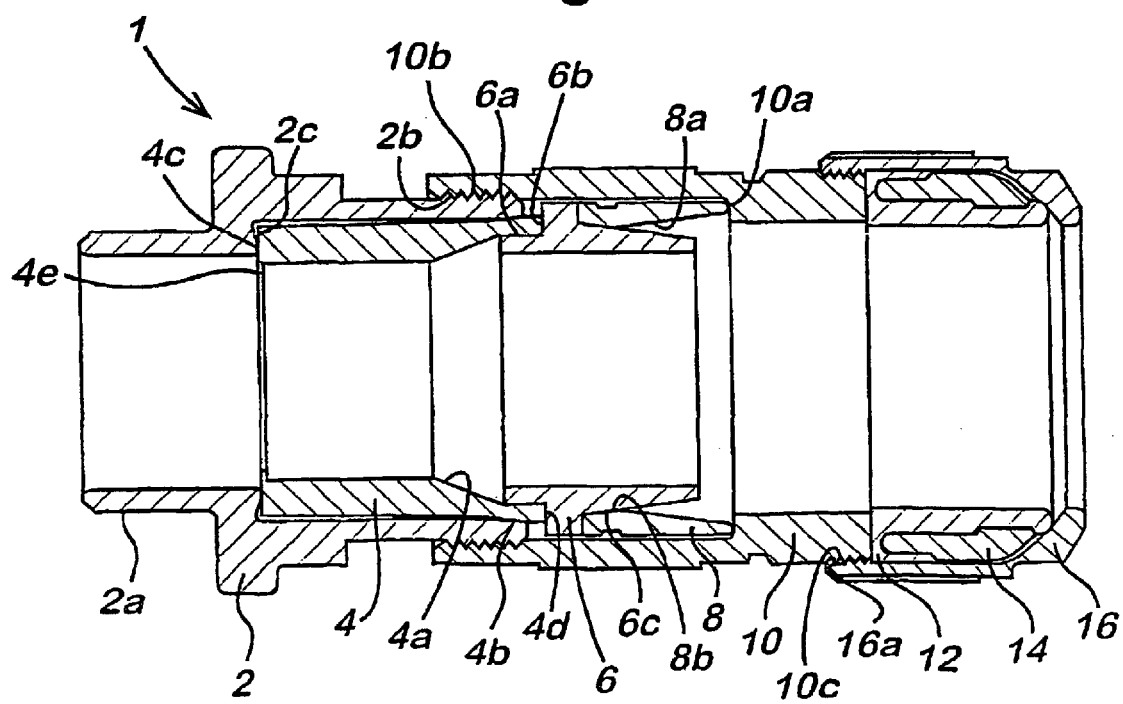
FIG. 1B is a side cross-sectional view along line A—A of the embodiment in FIG. 1A.
Figure 1C:
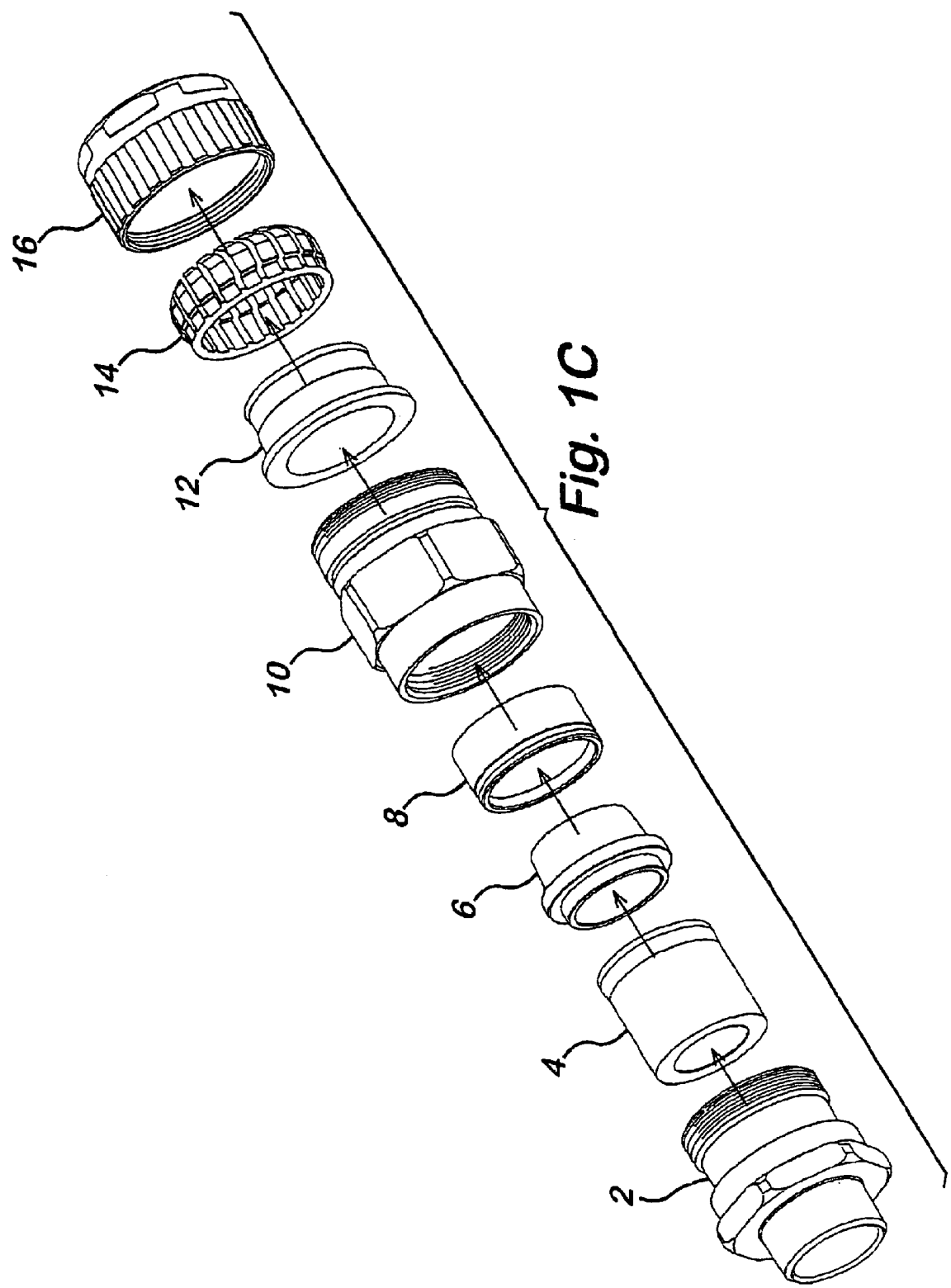
FIG. 1C is an exploded view of the embodiment in FIGS. 1A and 1B with the components shown disassembled.
Figure 2A:
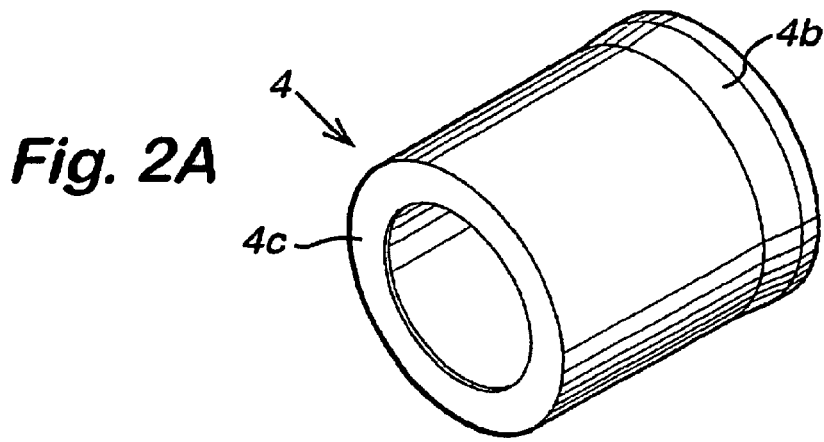
FIG. 2A is a perspective view of an embodiment of barrier sleeve according to the invention.
Figure 2B:
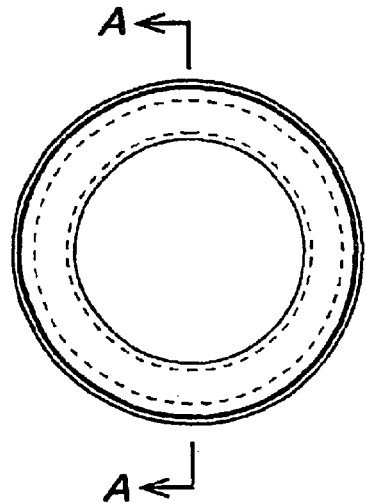
FIG. 2B is an end view of the sleeve embodiment in FIG. 2A.
Figure 2C:
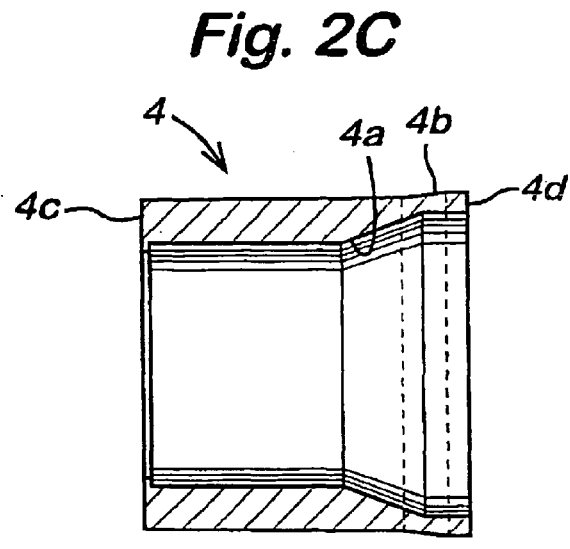
FIG. 2C is a side cross-sectional view along line A—A of the embodiment in FIG. 2B.
Figure 2D:
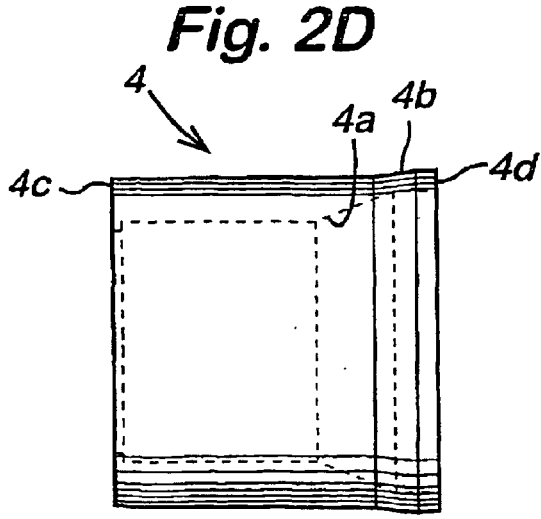
FIG. 2D is a side view of the embodiment in FIG. 2A.
Figure 2E:
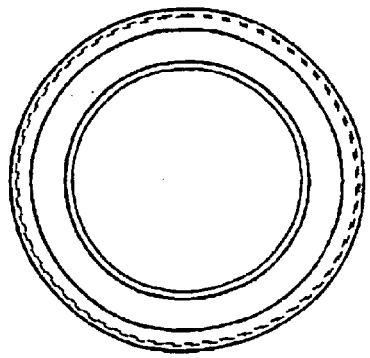
FIG. 2E is an opposite end view of the embodiment in FIG. 2A.

FIG. 1A shows an end view and FIG. 1B a side cross-sectional view on line A—A of an embodiment of a cable gland assembly 1 according to the invention. The assembly comprises an entry adapter 2, barrier sleeve 4, clamping spigot 6, clamping ring 8, compression sleeve 10, cable outer seal 12, seal urging member 14 and cap nut 16. In use the parts of the assembly are assembled axially as shown in FIG. 1B around the electric cable (not shown). The series of disassembled components are shown in FIG. 1C.

The entry adapter 2 has a threaded surface 2a for engagement with a threaded bore of an item of electric equipment (not shown).

The barrier sleeve 4 is made of a resilient or elastic material as described above. It is shown in more detail in FIGS. 2A to 2E. The bore of the sleeve 4 has a frusto-conical portion 4a near its opening. The sleeve 4 is of generally cylindrical form and has a widening portion 4b towards its frusto-conical end. The sleeve 4 also has a small shoulder 4e at its entry end. The sleeve 4 is designed for a sealing fit within the bore of the adapter 2. Typically, the sleeve 4 will be at least slightly compressed in the adaptor bore. In use the sleeve 4 is located within the bore of the adapter 2 with the annular end surface 4c of the sleeve abutting the shoulder 2c in the bore of the adapter 2. The clamping spigot 6 in use is located against the sleeve 4. On the entry side of the spigot 6 is an annular surface 6a adjacent to a shoulder 6b. The annular surface 6a locates within the bore of the sleeve 4 such that the shoulder 6b abuts the annular end surface 4d of the sleeve 4.

The clamping ring 8 has a tapering bore 8a which in use is located around the clamping spigot 6 to enable an armor or earth element of the cable (not shown) to be clamped between the surface 8b of the ring 8 and the annular surface 6c of the spigot 6.

The compression sleeve 10 is located around the spigot 6 and ring 8. The compression sleeve 10 has a threaded portion 10b which in use engages with the threaded portion 2b of the adapter 2. The compression sleeve 10 has a shoulder 10a which abuts the end of the ring 8.

The cap nut 16 has a threaded portion 16a which in use engages with a threaded portion 10c of the compression sleeve 10. Located within the cap nut 16 are the cable outer seal 12 and seal urging member 14.

In use there will also be a hardenable compound (not shown) disposed within the bore of the sleeve 4 and spigot 6 and filling the space around and between the cable conductor cores which pass therethrough (not shown).

The assembly and use of the cable gland will now be described.

A portion of the outer sheath of the electric cable (not shown) is removed to expose the inner conductor cores, inner sheath and e.g. armour. The cap nut 16, seal urging member 14 and cable seal 12 assembled with compression sleeve 10 (but not compressed) are passed over the outer sheath of the cable.

Then the clamping ring 8 is passed over the armour and the clamping spigot 6 with its tapered surface 6c is located under the armour. The compression sleeve 10 may be located and tightened onto the entry adapter 2 to firmly clamp the armour between the ring 8 and spigot 6. The compression sleeve 10 is then removed from the adaptor 2 so that the conductor cores may be spread apart for compound packing.

The conductor cores are spread apart and the hardenable compound is applied to the crutch between the cores. The cores are then brought back towards each other and the area around the cores and the space between the cores and the spigot 6 are filled with the compound. Details of the compound, including its preparation and application, are well known to the skilled person.

The barrier sleeve 4 is then passed over the cores and the compound before it starts to harden and the end of the sleeve 4 is located on the spigot 6, the end face 4d of the sleeve 4 abutting against the shoulder 6b of the spigot 6. Any excess compound is trimmed away. The conductor cores, sleeve 4 and spigot 6 are then located in the entry adapter 2 and the compression sleeve 10 is located on the entry adapter 2 and tightened. This compresses the compound and also forms a flame proof seal between the entry adapter and the sleeve 4. The sleeve 4 by radial and/or axial deformation has a sealing fit in the bore of the adaptor 2, particularly in the region of the widened portion 4b of the sleeve 4. An improved seal between the sleeve 4 and the adaptor 2 is thereby achieved. Moreover, the need for a separate seal between the sleeve and adaptor is avoided. The cap nut 16 is tightened on the compression sleeve 10 such that the seal urging member 14 urges the cable outer seal 12 into engagement with the outer sheath of the cable to form a seal therebetween.

Figure 3A:
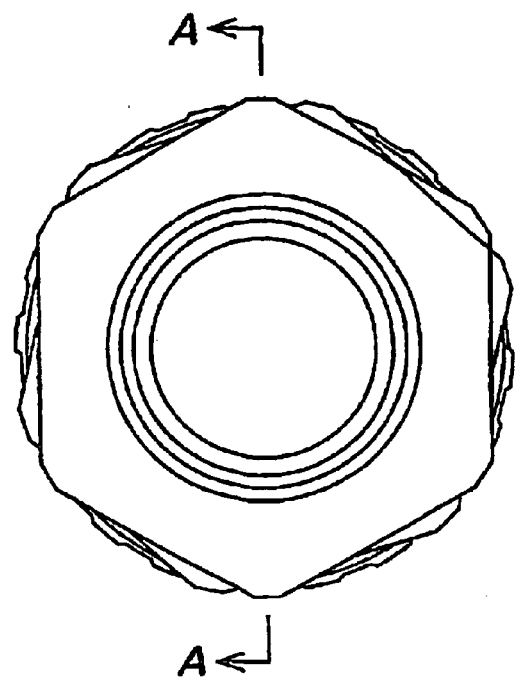
FIG. 3A is an end view of a further embodiment of a cable gland assembly according to the invention.
Figure 3B:
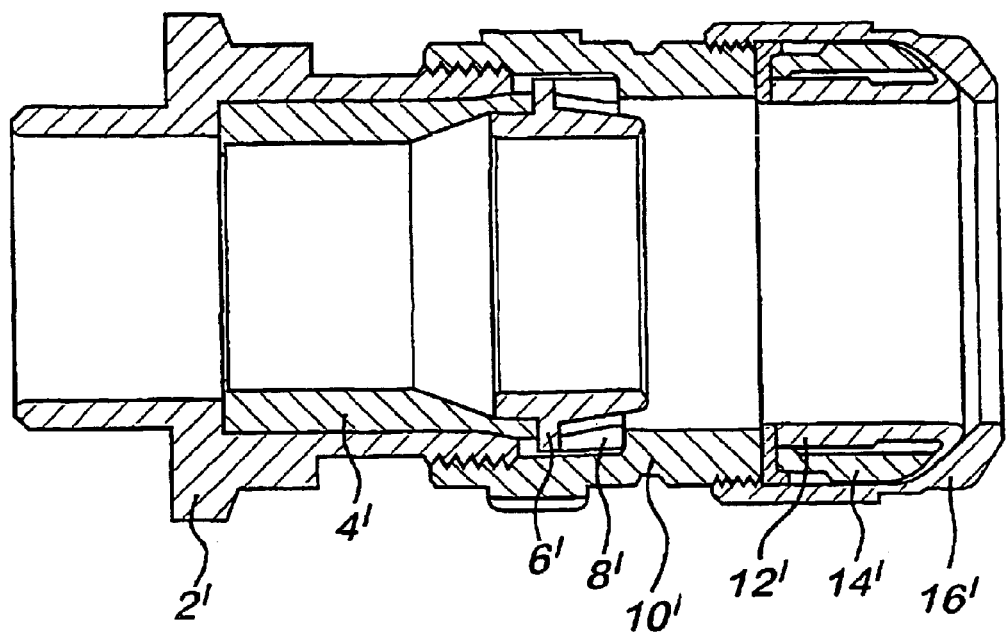
FIG. 3B is a side cross-sectional view along line A—A of the embodiment in FIG. 3A.

The foregoing embodiment is just one construction of cable gland assembly that the resilient or elastic barrier sleeve of the invention may be used in. It will be appreciated by the skilled person that the invention may be employed in many other constructions of cable glands assemblies. Another construction of cable gland assembly is shown in FIGS. 3A and 3B. Similar components in the embodiment in FIGS. 3A and 3B to the components in FIGS. 1A and 1B are given similar reference numerals (2', 4' etc.).

Figure 4A:
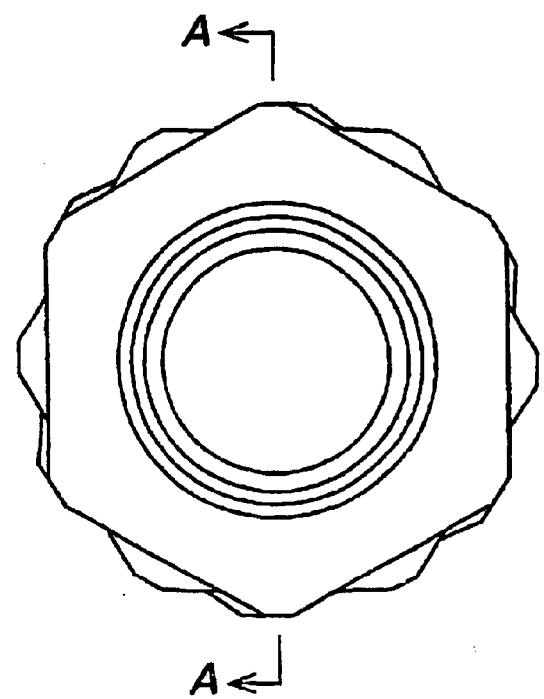
FIG. 4A is an end view of a still further embodiment of cable gland assembly according to the invention.
Figure 4B:
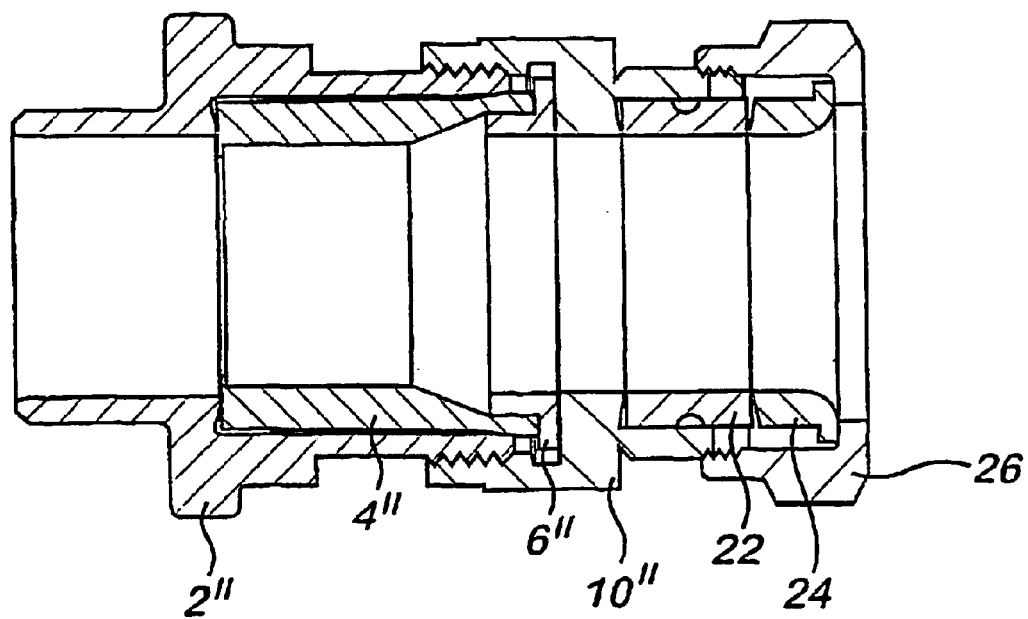
FIG. 4B is a side cross-sectional view along line A—A of the embodiment in FIG. 4A.

Another construction of cable gland assembly is shown in FIGS. 4A and 4B. Similar components in the embodiment in FIGS. 4A and 4B to the components in FIGS. 1A and 1B are given similar reference numerals (2", 4" etc.). The cable gland assembly in FIGS. 4A and 4B is for a non-armoured cable. It can be seen that the spigot 6" and compression sleeve 10" are of different construction than in the cable gland assembly in FIGS. 1A and 1B. Moreover, the cable gland assembly in FIGS. 4A and 4B comprises a different form of cable outer seal 22, seal urging means 24 and cap nut 26.

What is claimed is:

1. A cable gland assembly for an electric cable having a sheath enclosing at least one conductor core, the assembly comprising:

a cable gland having an entry adapter body;

a barrier sleeve, a spigot member, a compression sleeve and a cap nut;

said barrier sleeve being at least partially formed of a resilient or elastic material and positioned within a bore in the entry adapter body, wherein the at least one conductor core extends through the entry adapter body and the barrier sleeve; and a hardenable compound disposed within the barrier sleeve between the barrier sleeve and the at least one conductor core.

2. A cable gland assembly as recited in claim 1, wherein the resilient or elastic material of the barrier sleeve comprises a rubber or elastomer material.

3. A cable gland assembly as recited in claim 1, wherein the barrier sleeve is compressed when positioned within the entry adapter body bore.

4. A cable gland assembly as recited in claim 3, wherein the barrier sleeve is compressed by the spigot member.

5. A cable gland assembly as recited in claim 4, wherein said spigot member has an annular surface and said annular surface of the spigot member is positioned within a bore of the barrier sleeve.

6. A cable gland assembly as recited in claim 4, wherein said spigot member has a shoulder, said barrier sleeve has an annular end face and wherein said shoulder of the spigot member abuts said annular end face of the barrier sleeve to compress the barrier sleeve.

7. A cable gland assembly as recited in claim 1, wherein the resilient or elastic material of the barrier sleeve forms a seal between a portion of the barrier sleeve and the entry adapter body.

8. A cable gland assembly as recited in claim 7, wherein the seal is provided between substantially the entire length of the barrier sleeve and the entry adapter body.

9. A cable gland assembly as recited in claim 1, wherein said barrier sleeve defines a bore and said bore of the barrier sleeve includes a frusto-conical entry portion.

10. A cable gland assembly as recited in claim 1, wherein said barrier sleeve is substantially completely formed of said resilient or elastic material.

11. A cable gland assembly for an electric cable having a sheath enclosing a plurality of conductor cores, the assembly comprising an entry adapter body defining a bore and a barrier sleeve locatable in the entry adaptor body bore, wherein the cores extend through the entry adaptor body and the barrier sleeve and a hardenable compound is disposed in the barrier sleeve filling the sleeve and directly surrounding the conductor cores, the barrier sleeve is formed of a resilient or elastic material, said barrier sleeve being compressed to form a seal between the body and at least a portion of the barrier sleeve, and the barrier sleeve is compressed by a spigot member.

12. A cable gland assembly as recited in claim 11, wherein the resilient or elastic material comprises a rubber or elastomer material.

13. A cable gland assembly as in claim 11, wherein said spigot member has an annular surface and said annular surface of the spigot member locates within a bore of the barrier sleeve.

14. A cable gland assembly as recited in claim 11, wherein said spigot member further includes a shoulder, said barrier sleeve has an annular end face and said shoulder abuts said annular end face of the barrier sleeve and compresses the barrier sleeve.

15. A cable gland assembly as recited in claim 11, wherein a bore of the barrier sleeve has a frusto-conical shaped entry portion.

16. A cable gland assembly as recited in claim 11, wherein the barrier sleeve provides a seal between substantially the entire length of the barrier sleeve and the entire entry adapter body.

17. A cable gland assembly as recited in claim 11, wherein said barrier sleeve compression results in deformation of said barrier sleeve.

* * * * *